April 14, 1931.    J. R. KELLY    1,800,257
ROTARY MOWER
Filed March 30, 1929    2 Sheets-Sheet 1

INVENTOR
JOHN R. KELLY
ATTORNEY.

April 14, 1931.  J. R. KELLY  1,800,257
ROTARY MOWER
Filed March 30, 1929  2 Sheets-Sheet 2
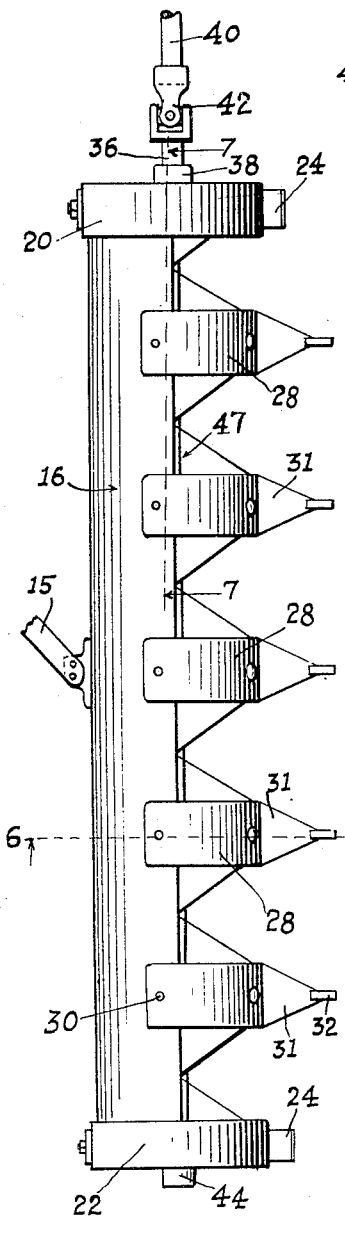
FIG. 3.
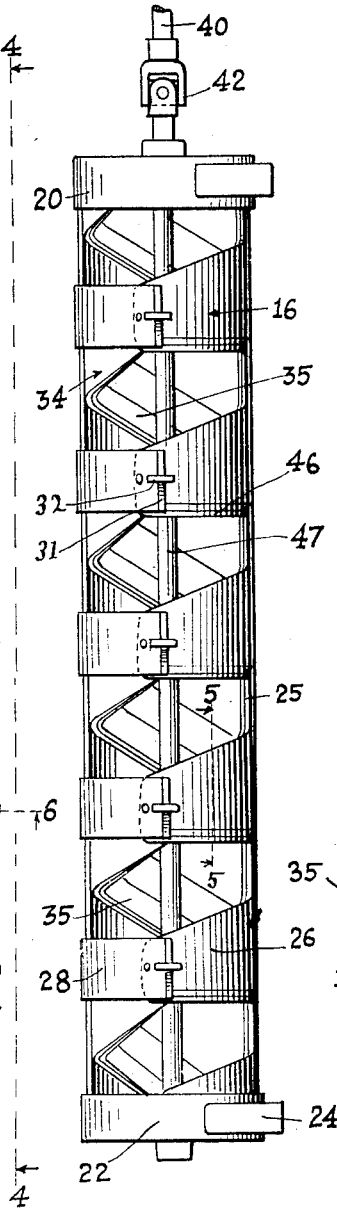
FIG. 4.
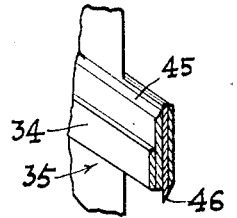
FIG. 5.
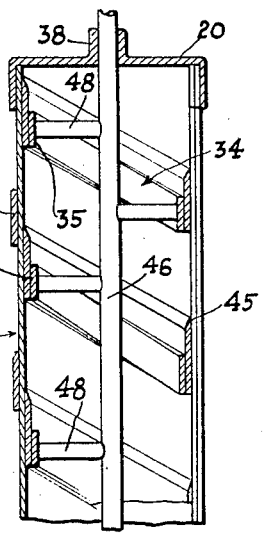
FIG. 6.
FIG. 7.
INVENTOR
JOHN R. KELLY
ATTORNEY.

Patented Apr. 14, 1931

1,800,257

UNITED STATES PATENT OFFICE

JOHN R. KELLY, OF IMPERIAL, CALIFORNIA

ROTARY MOWER

Application filed March 30, 1929. Serial No. 351,192.

This invention relates to mowing machines and has been adapted especially to cutting heavy growths of weeds and similar thick-stemmed plant life.

In many localities where moisture is plentiful, for example the banks of canals, rank growths of weeds and coarse grasses develop, these having heavy stalks which commonly offer a severe task to the conventional reciprocating mower.

The object of the present invention is to provide a highly serviceable and efficient mowing machine for heavy stalked growths such as those above mentioned, and also to develop a mower wherein a good slicing, a drawing action of the cutting edge through the stalk, is developed as distinguished from the usual direct shearing action, thereby to improve the cutting abilities of the machine.

Briefly the invention resides in a suitably slotted housing in which there is rotatably mounted a rotary cutter preferably of helical or spiral form, at least portions of the edges of this member being in the form of cutting edges which cooperate with edges of the fingers formed by the slots to complete the cutting action. The advancing movement of the rotary helical or spiral member causes a slicing action which is much more efficient and positive than a shearing action. Guide fingers may also be provided to guide the growth into the receiving slots, and spacing shoes position the casing at the desired distance above the ground. The mower is conveniently mounted upon and driven from a tractor.

In the accompanying drawings wherein one embodiment of the invention is disclosed as an illustration;

Fig. 3 is a plan view of the mower per se;

Fig. 4 is a side elevation thereof as indicated by line 4—4 of Fig. 3;

Fig. 5 is a sectional detail taken on the line 5—5 of Fig. 4;

Fig. 6 is a cross section on line 6—6 of Fig. 3;

Fig. 7 is a longitudinal sectional detail taken on line 7—7 of Fig. 3.

Figure 1:
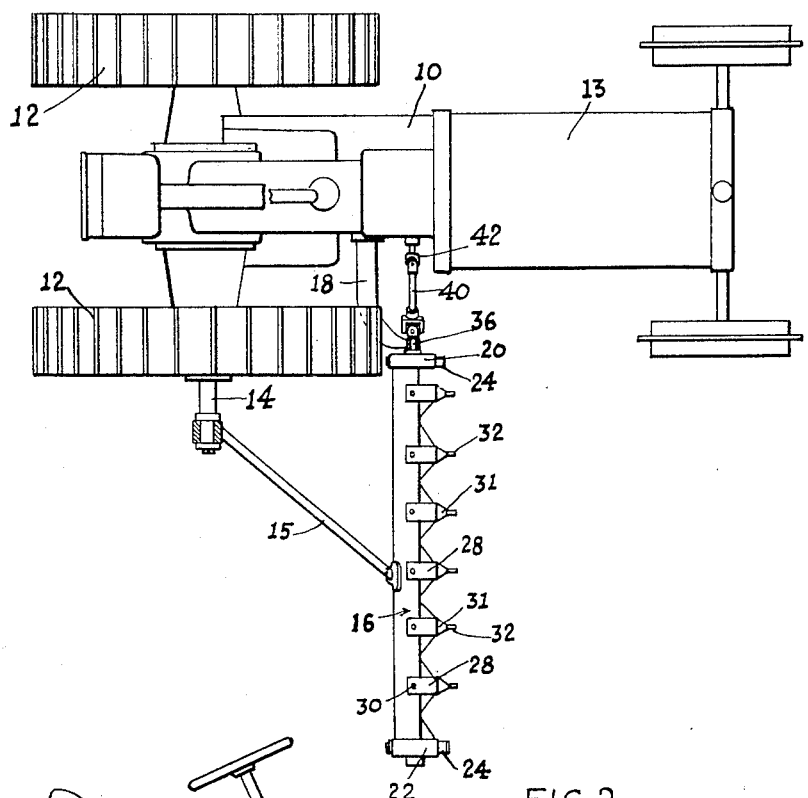
Fig. 1 is a plan view showing the mower mounted upon a tractor.
Figure 2:
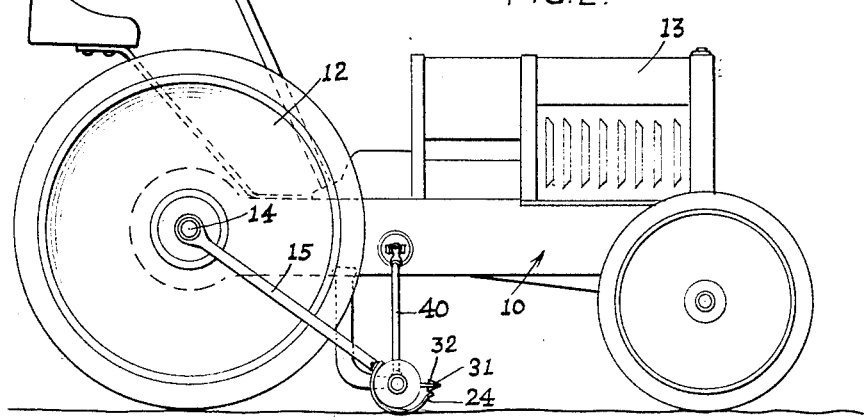
Fig. 2 is a side elevation of the assembly of Fig. 1, the mower thus appearing in end elevation.

In Figs. 1 and 2 there is shown a conventional tractor having a chassis 10 provided with drive wheels 12 driven from an engine under the hood 13 through the medium of the rear axle 14, and upon the end of this axle a suitable mounting is provided for a supporting and positioning arm 15 whose outer end is secured to a parti-cylindrical mower housing 16. At the inner end of said housing 16 there is provided a second positioning and supporting arm 18 which is secured to the chassis 10, this arm engaging a head or cap 20 of the housing. The outer end of the housing 16 also is closed by a head or cap as indicated at 22, and to the caps 20 and 22 there are secured guide shoes 24 which are adapted to travel along the ground and insure proper spacing of the mower therefrom.

The forward portion of the housing is slotted at 25 to provide forwardly and upwardly projecting fingers 26 which cooperate with downwardly and forwardly projecting fingers 28 to divide the growth into lanes and feed it to the cutter. The arcuate plates 28 may be separate pieces bolted to the upper edge of the housing at 30 as best seen in Fig. 3, these plates tapering at their forward ends 31 and terminating in tips 32. Thus, proper division of the growth and passage thereof into the slots 25 is assured.

The cutter shown is in the form of a helical wound ribbon-like member 34 working within the housing 16; preferably it is provided on its inner face with a reinforcing strip 35 to insure maintaining its form. This cutter is provided at its inner end with a stub shaft 36 working in a bearing 38 in the head 20, said stub shaft being connected through the medium of a transmitting shaft 40 and universal joints 42 with a power drive on the tractor. The outer end of the cutter 34 is journaled in a bearing 44 in the outer housing cap 22. Thus the cutter 34 is rotated on the bearings 38 and 44 from the tractor as a source of power. One edge of the cutter 34 is formed at 45 as a cutting edge which cooperates with cutting edges 46 formed on corresponding sides of the fingers 26 of the housing 16.

As the cutter 34 rotates, the growth to be cut is guided into the slots 25 between the fingers 26 and arcuate plates 28 and into the path of the helical cutter portions by which said growth is forced against the cutting edges 46 of the fingers 26. The rotary movement of the cutting elements causes the cutting edges 45 thereof to be drawn through the stalks being covered with a sort of slicing action which effectually completes the operation, the severed stalks falling back and thereby pulling their butts out of the path of the mower parts.

As shown in Fig. 7 it is desirable to extend the shaft 36 entirely through the housing in the form of a continuous shaft 47 which is connected at intervals with the helical cutter by means of arms 48 or the like, thereby lending rigidity to the structure.

I claim:

In a cutting machine, a substantially cylindrical housing having a plurality of slots formed therein between upwardly projecting fingers, a plurality of arcuate plates secured to said housing and overlapping said fingers, a helical cutter member rotatably mounted in said housing, said cutter member having a cutting edge engaging corresponding cutting edges formed on said fingers, a helical reinforcing strip secured to the inner face of said cutter member, a shaft extending through said cutter member, a plurality of arms connecting said shaft to the reinforcing strip on said cutter member, a cap secured to each end of said housing for rotatably supporting said shaft, and a connection for driving said cutter member.

In testimony whereof I affix my signature.

JOHN R. KELLY.